(12) United States Patent
Chau et al.

(10) Patent No.: US 10,698,539 B2
(45) Date of Patent: Jun. 30, 2020

(54) UV FILM SENSOR AND PREPARATION METHOD THEREFOR, AND TOUCH CONTROL SCREEN

(71) Applicant: LENS TECHNOLOGY (CHANGSHA) CO., LTD, Changsha, Hunan (CN)

(72) Inventors: Kwan Fei Chau, Hunan (CN); Qiaobing Rao, Hunan (CN); Zhong Cao, Hunan (CN)

(73) Assignee: Lens Technology (Changsha) Co., Ltd., Changsha (CN)

( * ) Notice: Subject to any disclaimer, the term of this patent is extended or adjusted under 35 U.S.C. 154(b) by 27 days.

(21) Appl. No.: 15/526,665

(22) PCT Filed: Sep. 10, 2015

(86) PCT No.: PCT/CN2015/089371
§ 371 (c)(1),
(2) Date: May 12, 2017

(87) PCT Pub. No.: WO2016/074528
PCT Pub. Date: May 19, 2016

(65) Prior Publication Data
US 2018/0107297 A1    Apr. 19, 2018

(30) Foreign Application Priority Data
Nov. 13, 2014    (CN) .......................... 2014 1 0640101

(51) Int. Cl.
*G06F 3/044*    (2006.01)
*C25D 13/12*    (2006.01)
(Continued)

(52) U.S. Cl.
CPC ............... *G06F 3/044* (2013.01); *C25D 5/00* (2013.01); *C25D 7/00* (2013.01); *C25D 13/02* (2013.01);
(Continued)

(58) Field of Classification Search
CPC combination set(s) only.
See application file for complete search history.

(56) References Cited

U.S. PATENT DOCUMENTS

| | | | | |
|---|---|---|---|---|
| 2009/0011197 | A1* | 1/2009 | Matsuhira | ......... G02F 1/133308 428/192 |
| 2009/0188726 | A1* | 7/2009 | Chang | ..................... G06F 3/041 178/18.03 |

(Continued)

FOREIGN PATENT DOCUMENTS

| CN | 102799296 A | 11/2012 |
|---|---|---|
| CN | 202887153 | 4/2013 |

(Continued)

OTHER PUBLICATIONS

JPO, Office Action dated Mar. 19, 2018, in JPA 2017-526128 (with English translation), 5 pgs.

(Continued)

*Primary Examiner* — Temesghen Ghebretinsae
*Assistant Examiner* — Sosina Abebe
(74) *Attorney, Agent, or Firm* — Henry Patent Law Firm PLLC

(57) ABSTRACT

The present disclosure provides a UV film sensor, a preparation method therefor, and a corresponding touch screen. The UV film sensor comprises a film substrate (A) containing a printing surface (a) and an attaching surface (b), and a UV adhesive layer (1), an electroplated color developing
(Continued)

particle layer (2), an ink layer (3), a hardened layer (4), an index matching layer (5) and a transparent conducting layer (6) for constructing a touch function structure are sequentially formed on the printing surface of the film substrate from one side close to the film substrate to the other side away from the film substrate. The touch screen is obtained after adhering a cover glass to the attaching surface of the film substrate in the UV film sensor via an optical grade transparent double-sided adhesive. The obtained touch screen only contains one layer of substrate. The touch screen can be thinner as a whole. A touch function structure is directly implemented on a UV film, and compared with the traditional process, multiple processes are reduced, the product thickness is decreased, the output and yield are improved, and the costs are decreased.

16 Claims, 2 Drawing Sheets

(51) Int. Cl.
| | | |
|---|---|---|
| *C25D 13/02* | (2006.01) | |
| *C25D 5/00* | (2006.01) | |
| *C25D 7/00* | (2006.01) | |

(52) U.S. Cl.
CPC .... *C25D 13/12* (2013.01); *G06F 2203/04103* (2013.01)

(56) References Cited

U.S. PATENT DOCUMENTS

| | | | | |
|---|---|---|---|---|
| 2012/0299867 A1* | 11/2012 | Yu | ............................ | G06F 3/044 345/174 |
| 2013/0120283 A1* | 5/2013 | Tung | ........................ | B32B 37/12 345/173 |

FOREIGN PATENT DOCUMENTS

| | | | |
|---|---|---|---|
| CN | 103382091 | | 11/2013 |
| CN | 103383608 | | 11/2013 |
| CN | 103383608 A | * | 11/2013 |
| CN | 103396012 | | 11/2013 |
| CN | 103885626 | | 6/2014 |
| CN | 203930765 | | 11/2014 |
| CN | 104375704 | | 2/2015 |
| CN | 204143412 | | 2/2015 |
| EP | 2527905 | | 11/2012 |
| JP | 2012203701 | | 10/2012 |
| JP | 2013178643 | | 9/2013 |
| WO | 2006105274 | | 10/2006 |

OTHER PUBLICATIONS

"State Intellectual Property Office of the P.R. China", International Search Report and Written Opinion in PCT App. No. PCT/CN2015/089371 dated Dec. 2, 2015, 10 pages.

SIPO, Office Action issued in CN201410640101.5 dated Jun. 12, 2017, 12 pgs.

* cited by examiner

UV FILM SENSOR AND PREPARATION METHOD THEREFOR, AND TOUCH CONTROL SCREEN

TECHNICAL FIELD

The present disclosure relates to the field of touch technology, and more particularly to a UV film sensor, preparation method thereof and a corresponding touch screen.

RELATED ART

A cover glass of a touch panel is a human-machine interface window, the substrate of which is mostly a reinforced glass. A touch sensor of the touch panel is an electrical component to achieve the touch function, takes mostly glass or specific film (organic film) as the substrate, and is formed by electroplating transparent conductive layer on the substrate. In order to make the touch panel present a color pattern, the current mainstream technology in the industry is to firstly coat a specific organic film substrate with a specific layer of UV adhesive and then form a set pattern though molding, and then form a decorative film having a color molding effect by plating of color developing particles and screen printing of ink as a substrate, and then attach the decorative film to a clear cover glass (clear CG) to form a cover glass, and finally attach and assemble a separately formed touch sensor to the clear cover glass having the decorative film. A touch panel with a color molding effect may be processed by using this method, the general process of which is as follows: UV coating on the film → molding → electroplating → screen printing of ink → stripping screen printing of ink → cutting → visual inspection → attaching with clear CG → defoaming → visual inspection → attaching and assembling with touch sensor comprising film or glass substrate.

That is, the conventional process is to form a touch structure A on a layer of organic thin film (film substrate) or a glass substrate, and form a decorative film B with another organic film. After attaching the decorative film B to the clear cover glass C and attaching A onto the attached B and C, the touch screen is formed. The use of the above process lead to a thicker product, long manufacture process, decreased yield, and increased cost.

For example, patent application CN103631455A relates to a thin film sensor, a capacitive touch screen comprising the sensor, a method of manufacturing the same, and an end product. The film sensor provided has only one optically transparent substrate, and two surfaces of the substrate are respectively plated with a sensing electrode layer and a driving electrode layer, which is advantageous for reducing the thickness of the film sensor, thereby facilitating the minimization of touch screen and hand touch electronic products. However, the touch sensor in this patent document is provided with a substrate, and the touch screen obtained by attaching the same with a decorative film containing a substrate and a clear cover glass still contains at least two substrates.

SUMMARY

The present disclosure provides a new way of preparing a touch screen, i.e. forming a touch sensor on a substrate of a decorative film in a certain way, and then combining the touch sensor with a clear cover glass to form a touch screen of the present disclosure. Therefore, the touch screen product of the present disclosure contains only one substrate, resulting in a thinner touch screen product as a whole. The disclosure realizes the touch structure component directly on the UV film (decorative film), which reduces a number of processes, reduces the product thickness, improves the yield and quality and saves the cost compared with the traditional process.

In view of the deficiencies of the prior art, it is an object of the present disclosure to provide a UV film sensor which achieves touch structure integration on a UV film and its preparation method for enabling a touch panel to exhibit a color molding effect while reducing the processing steps, improving the yield, and reducing the thickness of the product.

The present disclosure achieves the above object by the following technical solutions:

The present disclosure provides a UV film sensor comprising a film substrate A comprising a printing surface a and an attaching surface b, from one side close to the film substrate to the other side away from the film substrate, a UV adhesive layer 1, an electroplated color developing particle layer 2, an ink layer 3, a hardened layer 4, an index matching layer 5, and a transparent conductive layer 6 for building a touch function structure are formed successively on the printing surface of the film substrate.

In a specific embodiment, the UV adhesive layer, the electroplated color developing particle layer and the ink layer are all located on a frame region, and the hardened layer and the transparent conductive layer cover the entire printing surface of the film, and the index matching layer comprises at least the index matching layer located on a viewing region, and may further comprise the index matching layer formed partially or entirely on the frame region.

It is preferable that a transparent insulating layer 7 and a conductive jumper and peripheral wire layer 8 are further formed on the transparent conductive layer 6 of the UV film sensor, and a protective insulating layer on the peripheral wire layer 8 may be provided. The conductive jumper and peripheral wire layer comprises a conductive jumper 81 located on the viewing region of the UV film sensor and a peripheral wire 82 located on the frame region of the UV film sensor. In the present disclosure, the touch function structure of the sensor is embodied in a variety of ways, for example, may be formed of a single layer of transparent conductive layer 6, and may be formed by combining the transparent conductive layer 6, the transparent insulating layer 7, and the conductive jumper and peripheral wire layer 8.

The present disclosure also provides a method of preparing the UV film sensor comprising following steps: coating a UV adhesive layer on the printing surface of the film substrate, and subjecting the film substrate to steps of UV molding, electroplating of color developing particle layer, screen printing of ink, and stripping, to form a decorative film with color molding effect and obtain a UV film, and on the printing surface of the UV film, a hardened layer, an index matching layer and a transparent conductive layer are further formed, and then a touch function structure is built on the transparent conductive layer, obtaining the UV film sensor.

In the present disclosure, said steps of UV molding and electroplating the color developing particles are applied to the entire frame region and may be applied to a portion or an entirety of the viewing region; said step of screen printing of ink is precisely applied to the frame region, and there is no ink on the viewing region 11; the stripping step comprises etching off the UV adhesive coated and the color developing particles electroplated on the non-ink region of the UV film with the stripping solution.

In a specific embodiment of the present disclosure, said step of forming the hardened layer comprises forming the hardened layer on the entire printing surface of the film; the step of forming the index matching layer comprises forming the index matching layer on at least the viewing region, and may comprise further forming the index matching layer partially or entirely on the frame region; the step of forming the transparent conductive layer comprises forming the transparent conductive layer on the entire printing surface of the film; said building of the touch function structure comprises forming the transparent conductive layer into the set touch pattern using the photolithography technology, including forming an X-axis transparent conductive channel and a Y-axis transparent conductive channel.

In the present disclosure, it is preferable to further comprise a second step of screen printing of ink after the stripping step to obtain a UV film; wherein said (first) step of screen printing of ink comprises screen printing ink on a region of the frame region other than a particular hole, while said second step of screen printing of ink comprises screen printing ink in the particular hole on the frame region, and the particular hole comprises, for example, one or more of an IR hole, a camera hole, a breathing light hole, an icon and a trademark.

In a specific embodiment of the present disclosure, said step of UV molding comprises molding or screen printing with UV adhesive on the printing surface of the film substrate to form a pattern, and then baking the film substrate and irradiating it with UV light to make the UV adhesive cured, to form a UV adhesive layer with a drawing line and/or CD pattern. Preferably, the UV adhesive comprises a raw UV adhesive, a varnish, an auxiliary agent and a diluent in a mass ratio of 120-100:30-10:10-5:2-1.

Preferably, the electroplating comprises electroplating 1-5 layers of color developing particles on the printing surface of the film substrate, and the screen printing of ink comprises screen printing 1-5 layers of ink on the frame region of the film substrate.

In the present disclosure, the method further comprises forming a transparent insulating layer 7 and a conductive jumper and peripheral wire layer 8 on the transparent conductive layer 6 on which the touch pattern has been built; by screen printing or photolithography technology with conductive silver paste or other low-impedance conductive material such as aluminum or copper or alloy thereof, the peripheral wire layer forms a wire on the frame region of UV film, and the wire is connected with the end of the transparent conductive graphic channel in the peripheral.

The present disclosure also provides a touch screen comprising a UV film sensor described above or a UV film sensor prepared by the preparation method described above, and a cover glass 10 which is adhered by an optical grade transparent double-sided adhesive or a liquid optical adhesive 9 on the attaching surface of the film substrate.

The touch screen obtained in the present disclosure may be printed with a logo and frame ink, and has an electrical touch function while forming a specific color molded pattern on the frame region of the touch surface.

The method according to the present disclosure has the following advantages: the disclosure utilizes the UV adhesive molding of the UV film and the characteristic that the electroplated color developing particles exhibits particular colors to provide a specific molded appearance pattern and color effect to the window frame of the touch panel. In addition, the disclosure utilizes the integration of the touch structure on the existing substrate of the UV film, to provide the touch panel with the space obtained by removing the additional substrate originally needed to build the touch structure, achieving the effect of a reduced overall thickness, reduced cost, and simplified process.

DETAILED DESCRIPTION

Figure 1:
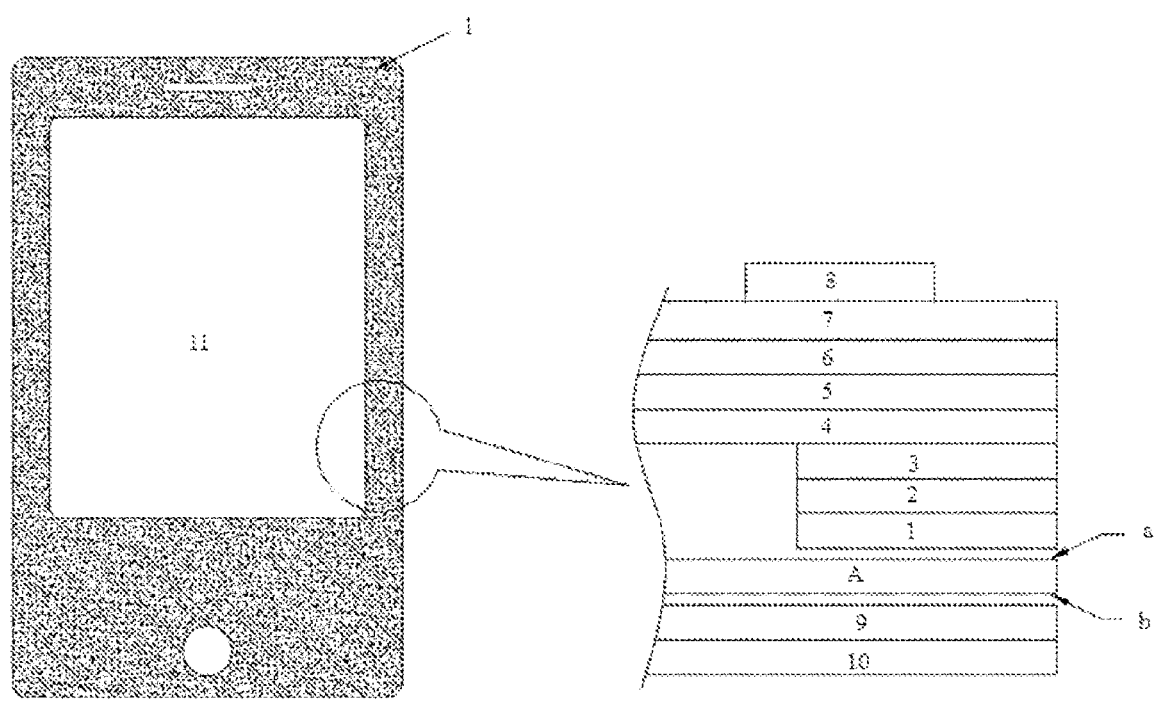
FIG. 1 is a schematic view of a partial area enlarged structure of a preferred embodiment of the present disclosure.
Figure 2:
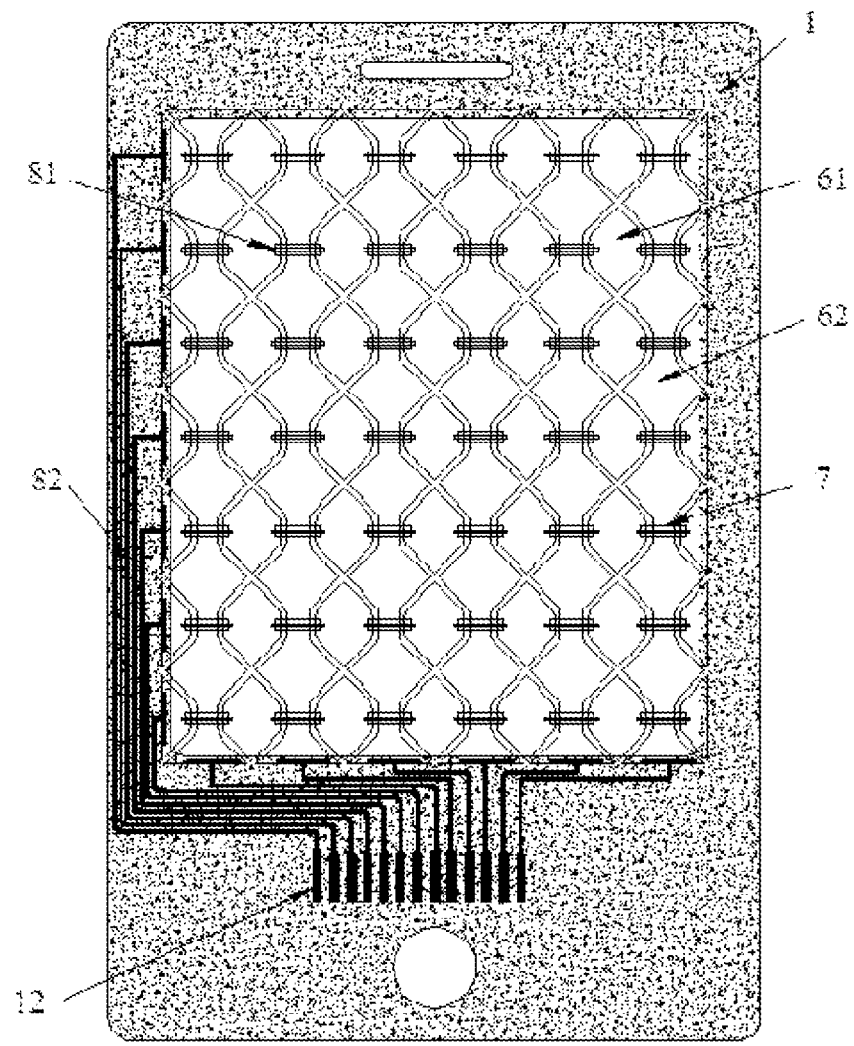
FIG. 2 is a schematic view of a partial area structure of a preferred embodiment of the present disclosure, in which 1—UV adhesive layer, 2—color developing particle layer, 3—ink layer, 4—hardened layer, 5—index matching layer, 6—transparent conductive layer, 61—X-axis transparent conductive channel, 62—Y-axis transparent conductive channel, 7—transparent insulating layer, 8—conductive jumper and peripheral wire layer, 81—conductive jumper, 82—peripheral wire, 9—optical grade transparent double-sided adhesive, 10—cover glass, 11—viewing region, 12—bonding interface line, A—film substrate, a—printing surface, b—attaching surface.

FIGS. 1 and 2 show a touch screen of a preferred structure of the present disclosure comprising a UV film sensor. The UV film sensor comprises a film substrate A containing a printing surface a and an attaching surface b. From one side close to the film substrate to the other side away from the film substrate, a UV adhesive layer 1, an electroplated color developing particle layer 2, an ink layer 3, a hardened layer 4, an index matching layer 5 and a transparent conductive layer 6 for constructing a touch function structure thereon are formed successively on the printing surface of the film substrate. The touch screen further comprises a cover glass 10 adhered with optical grade transparent double-sided adhesive 9 on the attaching surface of the film substrate.

In the present disclosure, two larger surfaces of the film substrate (the film substrate not adhered with optical grade transparent double-sided adhesive) have the same effect. In the present disclosure, one of the surfaces is defined as a printing surface and the other is defined as an attaching surface. It will be readily understood by those skilled in the art that if one surface of the film substrate used in the present disclosure has its own optical grade transparent double-sided adhesive, the other surface having a larger area is the printing surface.

The transparent conductive layer of the present disclosure may have different transparent conductive materials such as indium tin oxide, nano silver, carbon nanotube, graphene, etc., as long as the sheet resistance and optical transmittance, reflection, and chromaticity and other indicators of the formed transparent conductive film layer meet the requirements. Usually, the sheet resistance is controlled at 10-300Ω/□, the optical transmittance is greater than 85%, the reflectivity is smaller than 10%, and chromaticity $b^* \in (0,2)$.

In a specific embodiment, the UV adhesive layer, the electroplated color developing particle layer, the ink layer are all located on the frame region, while the hardened layer and the transparent conductive layer cover the entire printing surface of the film. The index matching layer includes at least the index matching layer located on the viewing region, and may further include the index matching layer partially or entirely formed on the frame region.

In the present disclosure, the UV film sensor comprises a viewing region 11 in the middle and an ink area located in the peripheral area which in turn may be referred to as the frame region. The film substrate is, for example, a PET plate, a COP board or a PC board.

Preferably, on the transparent conductive layer 6 of the UV film sensor, a transparent insulating layer 7 and a conductive jumper and peripheral wire layer 8 are further formed, and the conductive jumper and peripheral wire layer comprises a conductive jumper 81 located on the viewing region of the UV film sensor and a peripheral wire 82 on the frame region of the UV film sensor.

The method of preparing the UV film sensor in the present disclosure is as follows: the printing surface of the film substrate is subjected to steps of UV molding, electroplating of color developing particle layer, screen printing of ink, and stripping, to form a decorative film with color molding effect and obtain a UV film; on the printing surface of the UV film, a hardened layer, an index matching layer and a transparent conductive layer are further formed, and then a touch function structure is built on the transparent conductive layer, obtaining the UV film sensor.

In the present disclosure, the hardened layer, the index matching layer and the transparent conductive layer are obtained by electroplating or coating. Electroplating of the hardened layer on the entire surface of the printing surface of the UV film is for the purpose of preventing scratch. Forming the index matching layer is for the purpose of optically matching the refractive index, to make the visual appearance of touch pattern subsequently formed on a transparent conductive layer achieve a shadow vanishing effect. The formation of the transparent conductive layer is for the building of touch pattern.

In the present disclosure, the step of UV molding and the step of electroplating color developing particle layer are both applied to the entire frame region and may be applied to a portion or an entirety of the viewing region. The step of screen printing of ink occurs accurately on the frame region, while there is no ink on the viewing region 11. The stripping step comprises etching off the color developing particles electroplated on the non-ink region of the UV film with a stripping solution. In the present disclosure, neither of the step of the UV molding and the step of electroplating the color developing particle layer may be performed very precisely, while the step of screen printing of ink may be performed very precisely. One of the purposes of the screen printing of ink is to achieve the effect of shading the window frame. During the stripping step, the UV adhesive layer and the electroplated color developing particle layer protected by the screen printed ink are not affected by the stripping solution, while the UV adhesive and the color developing particles in the unprotected area are removed by stripping.

In a specific embodiment of the present disclosure, the step of forming the hardened layer comprises forming the hardened layer on the entire printing surface of the film. The step of forming the index matching layer comprises forming the index matching layer at least on the viewing region, and may comprise forming the index matching layer partially or entirely on the frame region. The step of forming the transparent conductive layer comprises forming the transparent conductive layer on the entire printing surface of the film, because part of the pattern may fall on the frame region at the time of subsequent formation of a touch structure (X-axis transparent conductive channel and Y-axis transparent conductive channel). Building the touch function structure comprises forming the transparent conductive layer into the set touch pattern using the photolithography technology, including forming the X-axis transparent conductive channel and the Y-axis transparent conductive channel.

In the present disclosure, it is preferable to further comprise a second step of screen printing of ink after the stripping step to obtain a UV film. Wherein the (first) step of screen printing of ink comprises screen printing ink on a region of the frame region other than a particular hole, while the second step of screen printing of ink comprises screen printing ink in the particular hole on the frame region. The particular hole comprises, for example, one or more of an IR hole, a camera hole, a breathing light hole, an icon and a trademark. It will be readily appreciated by those skilled in the art that, in the preferred solution of the present disclosure that performs two steps of screen printing of ink, the "non-ink region" in the stripping step comprises the viewing region and the particular hole on the frame region. In a specific embodiment, the second step of screen printing of ink comprises screen printing 1 to 5 layers of ink in the particular hole on the frame region of the UV film so as to be light-impermeable and adjust the light transmittance of the IR hole to 20%-30% (wavelength of 380 nm-650 nm), 70%-90% (wavelength of 650 nm-940 nm); the light transmittance of the camera hole≥90% (wavelength of 550 nm); the light transmittance of the breathing light hole to 5%-15% (wavelength of 550 nm); the light transmittance of the icon to 8%-12% (wavelength of 550 nm); trademark's specific optical chromaticity as well as decoration and indicator effect. In this solution, the special ink used in the second step of screen printing of ink may not be able to tolerate the erosion of the stripping solution in the stripping step, so that the second step of screen printing of ink is preferably carried out after stripping.

In a specific embodiment of the present disclosure, the step of UV molding comprises molding or screen printing with UV adhesive on the printing surface of the film substrate to form a pattern, and then baking the film substrate and irradiating it with UV light to make the UV adhesive cured, to form a UV adhesive layer with a drawing line and/or CD pattern. Preferably, the UV adhesive comprises raw UV adhesive, varnish, auxiliary agent and diluent in a mass ratio of 120-100:30-10:10-5:2-1.

The UV adhesive in the present disclosure is, for example, a colorless, semi-translucent colloid in which the raw UV adhesive, the varnish, the auxiliary agent and the diluent are commercially available. For example, the ND-5204MJ series UV adhesive is used as the raw UV adhesive, the HGL RX002 varnish is used as the varnish, the CARE55 additive is used as the auxiliary agent, and the T-980 diluent is used as the diluent. Among them, the addition of the components other than the raw UV adhesive is intended to facilitate the forming of the hardened layer, the index matching layer, the transparent conductive layer in the present disclosure as well as the building of the touch function structure on the transparent conductive layer. Preferably, the mass ratio among the raw UV adhesive, the varnish, the auxiliary agent and the diluent is 100:25:10:2. The baking temperature in the UV molding step of the present disclosure is, for example, 50 to 80° C., the baking time is 10-30 mins, and the energy of the UV light is 300-1000 mj/cm$^2$.

In a specific embodiment, the UV molding process is as follows: applying UV adhesive to one end of the mold, covering the mold with the film substrate after cleaning the printing surface of the film substrate, rolling a roller from where the adhesive is applied to the other end of the film substrate, so that the adhesive is spread in the entire film surface and filled into the gap in the mold, forming a set mold pattern.

Preferably, the electroplating comprises electroplating 1-5 layers of color developing particles on the printing surface of the film substrate, and the screen printing of ink comprises screen printing 1-5 layers of ink on the frame region of the film substrate. In the electroplating step of the present disclosure, the electroplated color developing particle layers of different colors comprises, for example, SiOx, NbxOy and TiOx. In the step of screen printing of ink of the present disclosure, after screen printing of each layer of ink, it is baked at a temperature of 55-95° C. for 5-35 mins.

In the present disclosure, the method further comprises forming a transparent insulating layer 7 and a conductive jumper and peripheral wire layer 8 on the transparent conductive layer 6 on which the touch pattern have been built. By screen printing or photolithography technology with conductive silver paste or other low-impedance conductive material such as aluminum or copper or alloy thereof, the peripheral wire layer forms a wire on the frame region of the UV film, and the wire is connected with the end of the transparent conductive pattern channel in the periphery.

The foregoing is merely the preferred embodiments of the present disclosure and is not intended to limit the disclosure, and various changes and modifications may be made by those skilled in the art. Any modifications, equivalent substitutions, improvements, and the like within the spirit and principles of the present disclosure are intended to be included within the scope of the present disclosure.

What is claimed is:

1. A UV film sensor comprising a film substrate comprising a printing surface and an attaching surface, wherein, from one side close to the film substrate to the other side away from the film substrate, a UV adhesive layer, an electroplated color developing particle layer, an ink layer, a hardened layer, an index matching layer, and a transparent conductive layer for building a touch function structure are successively and directly formed on top of each other on the printing surface of the film substrate, and wherein the hardened layer is formed as an intermediate layer between the ink layer and the index matching layer.

2. The UV film sensor according to claim 1, wherein the UV adhesive layer, the electroplated color developing particle layer and the ink layer are all located on a frame region, the hardened layer and the transparent conductive layer cover the entire printing surface of the film substrate, and the index matching layer comprises at least the index matching layer located on a viewing region.

3. The UV film sensor according to claim 2, wherein the index matching layer further comprises the index matching layer formed partially or entirely on the frame region.

4. The UV film sensor according to claim 1, wherein a transparent insulating layer and a conductive jumper and peripheral wire layer are formed on the transparent conductive layer of the UV film sensor, and the conductive jumper and peripheral wire layer comprises a conductive jumper located on a viewing region of the UV film sensor and a peripheral wire located on a frame region of the UV film sensor.

5. A touch screen comprising a UV film sensor according to claim 1, and a cover glass which is adhered by an optical grade transparent double-sided adhesive or a liquid optical adhesive on the attaching surface of the film substrate.

6. A method of preparing a UV film sensor, comprising:
subjecting a printing surface of a film substrate to steps of UV molding, electroplating of color developing particle layer, screen printing of ink, and stripping, to form a decorative film with color molding effect and obtain a UV film; and
forming a hardened layer, an index matching layer and a transparent conductive layer successively and directly on top of each other on the obtained UV film, and
building a touch function structure on the transparent conductive layer, to obtain the UV film sensor;
wherein the hardened layer is formed as an intermediate layer between the ink layer and the index matching layer.

7. The method according to claim 6, wherein said steps of UV molding and electroplating the color developing particles are applied to an entire frame region,
said step of screen printing of ink is precisely applied to the frame region, and there is no ink on the viewing region.

8. The method according to claim 7, wherein said steps of UV molding and electroplating the color developing particles are further applied to a portion or an entirety of a viewing region, and
the stripping step comprises etching off the color developing particles electroplated on a non-ink region of the UV film with a stripping solution.

9. The method according to claim 6, wherein said step of forming the hardened layer comprises forming the hardened layer on the entire surface of same side with said printing surface of the film,
the step of forming the index matching layer comprises forming the index matching layer at least on a viewing region,
the step of forming the transparent conductive layer comprises forming the transparent conductive layer on the entire surface of same side with said printing surface of the film, and
said building of the touch function structure comprises forming the transparent conductive layer into a set touch pattern using photolithography technology, including forming an X-axis transparent conductive channel and a Y-axis transparent conductive channel.

10. The method according to claim 9, wherein the step of forming the index matching layer further comprises forming the index matching layer partially or entirely on a frame region.

11. The method according to claim 6, wherein after the stripping step, the method further comprises a second step of screen printing of ink to obtain the UV film,
said step of screen printing of ink comprises screen printing ink on a region of a frame region other than a particular hole, and said second step of screen printing of ink comprises screen printing ink in the particular hole on the frame region, and
the particular hole comprises one or more of an IR hole, a camera hole, a breathing light hole, an icon and a trademark.

12. The method according to claim 6, wherein said step of UV molding comprises molding or screen printing with UV adhesive on the printing surface of the film substrate to form a pattern, and then baking the film substrate with the pattern and irradiating it with UV light to make the UV adhesive cured, to form a UV adhesive layer with a drawing line and/or CD pattern.

13. The method according to claim 12, wherein the UV adhesive comprises a raw UV adhesive, varnish, auxiliary agent and diluent in a mass ratio of 120-100:30-10: 10-5:2-1.

14. The method according to claim 6, wherein the electroplating comprises electroplating 1-5 layers of color developing particles on the printing surface of the film substrate, and the screen printing of ink comprises screen printing 1-5 layers of ink on a frame region of the film substrate.

15. The method according to claim 6, wherein the method further comprises forming a transparent insulating layer and a conductive jumper and peripheral wire layer on the transparent conductive layer on which a touch pattern has been built,
   by screen printing or photolithography technology with low-impedance conductive material, the conductive jumper and peripheral wire layer forms a wire on a frame region of the UV film, and the wire is connected with an end of a transparent conductive pattern channel in the periphery.

16. The method according to claim 15, wherein the low-impedance conductive material comprises conductive silver paste or aluminum or copper or alloy thereof.

\* \* \* \* \*